United States Patent Office 2,720,260
Patented Oct. 11, 1955

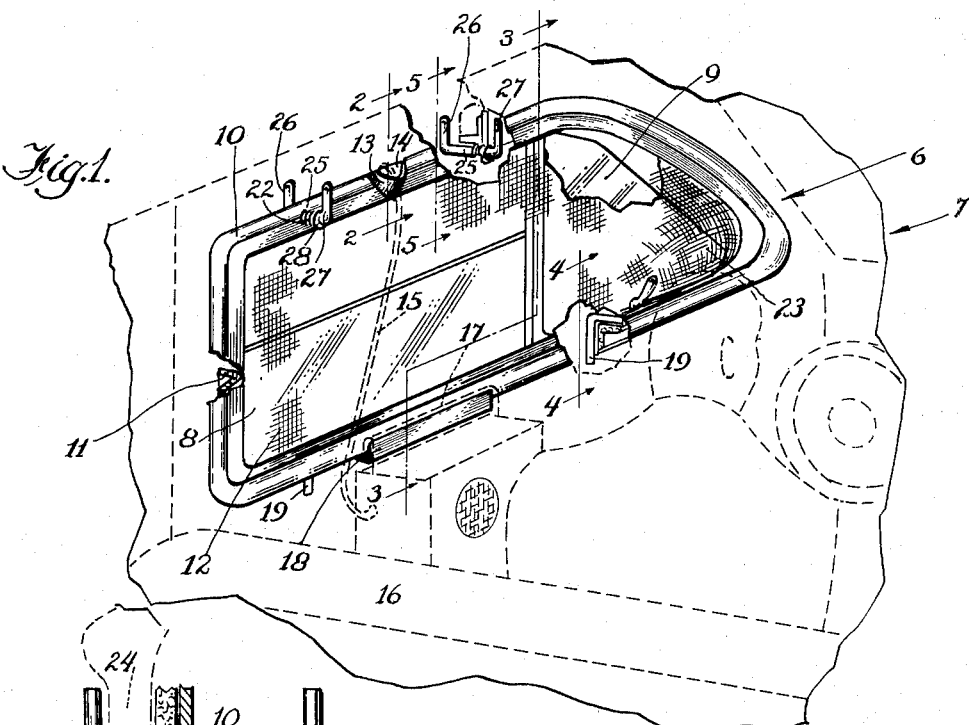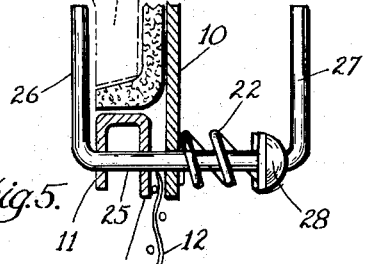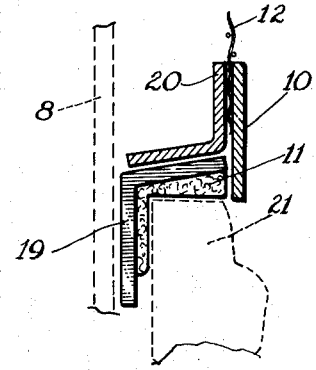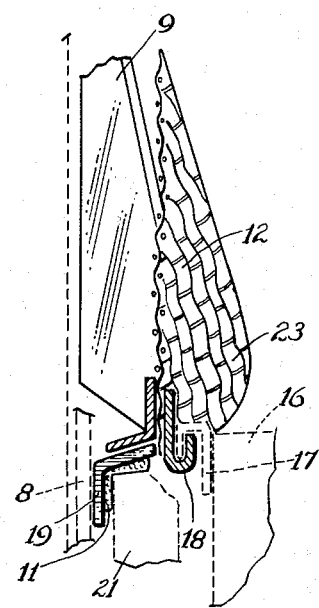

2,720,260
AUTOMOBILE WINDOW SCREEN
Theodore W. Plucinski, Chicago, Ill.

Application June 10, 1953, Serial No. 360,777

1 Claim. (Cl. 160—91)

My invention relates to screens particularly adapted for removable attachment interiorly of the windows of vehicles.

An important object of my invention is to provide a window screen of the aforementioned character which is provided with gauging and locating prong means, and spring-urged rotatable clip means for securing the same within the confines of a window opening in an automobile interiorly thereof, without impeding the operation of the movable window, nor of the oscillating, or the angularly moving ventilator thereof, so that the same may function as they would normally without the screen attachment.

Another object of my invention is to provide in a screen of the aforementioned character resilient, yieldable connection means to permit an electrical wire from outside the confines of the automobile to be brought into the automobile for securing an electrical instrumentality, or for hanging an electrical instrumentality on a hanger, or channel section, or extension of the said window screen framework.

A still further object of my invention is to provide in a window screen of the aforementioned character a bulging screen pocket section adapted to afford room for the movement of the ventilator associated with an automobile window.

A still further object of my invention is to provide a screen of the aforementioned character which is sealable against the window opening of a vehicle so as to prevent insects from reaching the interior confines of the automobile, the said arrangement being ideally useful when the automobile is parked in an outdoor motion picture theatre.

Other objects and advantages inherent in my invention will become apparent from an examination of the accompanying drawings, bearing further elucidation in the ensuing description, wherein like symbols are used to designate like parts, and in which:

Fig. 1 is a perspective view showing my invention inserted interiorly of an automobile and being placed alongside the left hand side of the driver of the vehicle.

Fig. 2 is a cross-sectional view taken, substantially, on the lines 2—2 of Fig. 1.

Fig. 3 is a cross-sectional view taken, on the staggered lines 3—3 of Fig. 1.

Fig. 4 is a cross-sectional view taken, substantially, on the lines 4—4 of Fig. 1.

Fig. 5 is a cross-sectional view taken, substantially, on the lines 5—5 of Fig. 1.

Referring to the various views my invention is generally designated 6 and is attached to an automobile generally designated 7 within the opening provided interiorly thereof and which acts as a support as indicated at 21 and 24 for the framework 10 of the screen comprising my invention. The framework 10 has a companion angularly sectioned portion 20 secured thereto, and a felt gasket or seal 11 in order not to mar the window opening of the automobile. The screen 12 is tautly stretched between the framework 10 and the angular structure 20, the felt gasket 11 being also of angular formation so as to fit the perimetral window opening 21.

The window 8 is free to be motivated up and down when needed, for example, if the conditions are windy, or if rain is to be prevented from entering the interior confines of the car, then the window 8 is free to be closed, as well as the ventilator 9 which usually oscillates on a longitudinal axis within an angular orbit. The screen 12 is tautly stretched within the framework and is stretched to form a pocket 23, bulging out interiorly of the confines of the car to afford clearance for the movement needed by the ventilator 9. The screen structure is located in place by virtue of the locating prongs 19 at the bottom lateral of the window opening and is secured at the top section 24 of the window opening by means of the clips 25 which are provided with locking prongs 26 and the handle portions 27, and inasmuch as they are preferably of U-shaped construction and have an enlarged hub 28 confining a spring 22 therebetween so that the handles 27 may be rotated to horizontal position, the screen being inserted by compressing the spring 22 and simultaneously rotating the handle 27 from a horizontal position to a vertical position will bring the locking portion 26 into engagement with the section 24 of the automobile window opening, thus holding the entire screen structure 6 in assembly.

A recessed or indented portion 13 is provided, in which a piece of sponge rubber 14 is secured, so as to afford a yieldable seal to permit the wire 15 of the loud speaker 16 to be brought in therethrough before engaging the clips 25 in assembly. A speaker is provided with a hanger 17 which is adapted to be supported by the channel section 18 formed integrally with the framework 10.

Thus the occupants of the automobile 7 which is parked in an outdoor movie lot will have comfort, and be free from annoyance by pests, insects and similar insect life, and if the weather should require the closing of the window, such as in rainy, windy, dusty or stormy weather, the window 8 may be closed, since it is not impeded in its normal operation, and the ventilator 9 may also be closed, or it may be left slightly open, in order to avail ventilation and fresh air to the occupants of the car at the same time preventing insect life from entering the interior confines of the automobile, thus providing ideal comfort to the occupants of the automobile for enjoyment of the amusement being presented.

Thus it can be seen that I have provided an ideal screen structure which is readily attachable to or removable from the interior confines of a window, a structure which will permit the insertion of an electrical connection for supporting an electrical instrumentality interiorly of the automobile, and a structure which will prevent insect life from entering the interior confines of the car which would cause annoyance and discomfort to the occupants of the automobile.

Although I have herein described rather succinctly the nature and use of my invention so that persons skilled in the art will have no difficulty apprising themselves of the teachings thereof and, inasmuch as the disclosure is susceptible of various alterations, modifications, and improvements, I hereby reserve the right to all modifications, alterations, and improvements falling within the scope and spirit of my invention, as well as any modifications that are embraced suggestively in the accompanying drawings, and any that may come within the purview of the foregoing description; my invention to be limited only by the appended claim.

Having thus described and revealed my invention, what I claim as new and desire to secure by Letters Patent is:

In a screen unit removably fitted interiorly to the opening of an automobile window, comprising a screen framework, and a screen tautly supported thereby and provided with a bulging pocket to furnish clearance for a ventilator customarily associated with the said automobile window; a pair of locating prongs secured to the bottom bar of the said screen framework, and a pair of spring-urged clips of U-shaped configuration pivotally secured on the opposite bar of the said screen framework and adapted to be rotated one quarter turn to secure the said screen unit in assembly, the window pane and the said ventilator being operable with said unit installed.

References Cited in the file of this patent

UNITED STATES PATENTS

| | | |
|---|---|---|
| 1,627,760 | Wood | May 10, 1927 |
| 1,753,795 | Linn | Apr. 8, 1930 |
| 2,012,871 | Featherston | Aug. 27, 1935 |
| 2,098,174 | Giberson | Nov. 2, 1937 |